Nov. 25, 1969     E. R. MANTEL ET AL     3,479,731

BRAZING METHOD

Filed June 13, 1967

INVENTORS.
Edward R. Mantel,
Charles W. Vigor &
BY Stephen W. Iwankovitsch
George A. Grove
ATTORNEY

United States Patent Office 3,479,731
Patented Nov. 25, 1969

3,479,731
BRAZING METHOD
Edward R. Mantel, Warren, Charles W. Vigor, Rochester, and Stephen W. Iwankovitsch, Warren, Mich., assignors to General Motors Corporation, Detroit, Mich., a corporation of Delaware
Filed June 13, 1967, Ser. No. 645,698
Int. Cl. B23k 1/04, 31/02
U.S. Cl. 29—472.3                    5 Claims

ABSTRACT OF THE DISCLOSURE

A complex assembly of metal components requiring a plurality of substantially linear brazed joints may be fabricated by applying a tacky material to the surfaces of the components which are to be joined; positioning the metal components in a predetermined relationship to form an unbrazed assembly, pressure being exerted at each area which is to be joined so as to obtain tight metal-to-metal contact; dusting the assembly with powdered braze alloy a portion of which adheres to the tacky substance adjacent each joint to be brazed, heating the assembly to first vaporize the tacky substance and then to melt the braze alloy such that it flows between and around the contact areas to form a fillet, and subsequently cooling the assembly to solidify the braze alloy and form a strong effective bond at each of the places to be joined.

---

This invention relates to a method of brazing together two metal surfaces at a region of relatively narrow or substantially linear contact therebetween to obtain a strong effective void-free bond. More particularly, this invention relates to a method of brazing a complex metal assembly wherein there may be required a number of narrow or substantially linear braze joints, many of which joints are virtually inaccessible by conventional techniques from the outside of the assembly.

There are a number of useful articles of manufacture which are, or may be, fabricated by brazing together a number of individual metal components. Many of these articles of manufacture are further characterized by the fact that the joints between the various metal components are relatively narrow, curved or straight bonds or lines and do not involve relatively large surface areas which are bonded together in any single joint. Examples of articles of this type include radiators, condensers, regenerators and other forms of heat exchangers wherein frequently relatively thin-walled sheet metal components are brazed together at points of substantially linear contact to provide internal passages for the fluids being processed. To obtain suitable physical strength and efficient heat transfer characteristics, it is necessary that each of the brazed joints is complete and void free so that heat transfer by conduction is not retarded and that there is no transverse flow of a process fluid out of its intended channel. In order that each braze be strong and void free, it is essential that the components to be joined be initially positioned in close metal-to-metal contact and maintained in this relationship throughout a joining operation. In many actual fabrication applications, the accomplishment of this goal is complicated by the fact that there may be a relatively large number of joints which must be brazed simultaneously. Furthermore, some of these joints are located at inner regions of the assembly which, once the components have been positioned properly, are difficult of access from the outside.

Of course, it is sometimes possible to build up an article formed of a number of sheet metal components piece by piece by performing each brazing, or other joining operation in sequence. However, it is appreciated that this generally is not an economical method of fabricating such a product. In the past the problem has been dealt with by preapplying a brazing material in suitable form to predetermined surfaces of the metal components prior to assembly. The components are then assembled and held in position with a suitable fixture while the entire assembly is furnace heated above the fusion point of the brazing alloy. This technique does not permit a number of brazes in a complicated structure to be accomplished simultaneously. However, the effectiveness of this method of brazing, as measured by the soundness of the respective completed joints, is unacceptable for many operations.

It has been observed that the preapplied braze alloy, while even of small particle size, prevents the metal components from being positioned in the first instance in close metal-to-metal contact. When there are a large number of such contacts to be made it will be appreciated that the problem compounds itself and the final assembly may be actually quite "loose" before the actual brazing operation is commenced. Then, upon heating the assembly for the purpose of fusing the braze alloy, the space between the metal components originally occupied by the unmelted alloy is never completely sealed by the braze fillet. The result is weak bonds containing a number of voids which, in a heat exchanger, permit the leakage of a process fluid out of its intended channel and reduce the efficiency of the device.

Accordingly, it is an object of the present invention to provide a method of brazing together two or more metal components over a portion of their respective surfaces to obtain a strong bond therebetween which is substantially free of voids.

It is a more specific object of the present invention to provide a method of forming one or more brazed joints in an assembly of metal components wherein said joints may be in a location difficult of access.

It is a further object of the present invention to provide a method of brazing a multicomponent metal assembly to obtain a plurality of bonds which are substantially linear in configuration under circumstances wherein, once assembled and heated to the fusion point of the braze alloy, the components cannot readily be repositioned to obtain the desired metal-to-metal contact at each joint.

In accordance with our invention, these and other objects may be accomplished, in general, by applying a thin layer of relatively viscous fluid tacky material to at least one or two of the metal components which are to be joined in regions where a brazed joint is desired. These metal components are then positioned together in the desired final relationship under pressure suitable to provide substantial metal-to-metal contact. At this point brazing alloy in powder form is dusted by sprinkling, brushing or other suitable application techniques about the assembled joint and the tacky material. A portion of the powder braze alloy adheres to the tacky substance effectively coating it. The rest is poured or shaken away from the joint and recovered for subsequent use. The assembly is then slowly heated to a suitable elevated temperature, during which period first the tacky substance is completely vaporized and then the brazing alloy is fused. The molten braze alloy wets the metal surfaces and under the influence of its own surface tension flows into the narrow space at the locations of close contact between the assembled metal components. A fillet is thus formed and upon cooling the braze alloy solidifies to provide a strong and substantially void-free bond between the metal components. Since there was nothing between the metal components in the first instance, other than the thin film of fluid tacky material, they were positioned into tight substantially metal-to-metal contact assembly prior to brazing. After the efficient application of the braze alloy to only the desired braze regions of the assembled structure, the subsequent fusion of the braze alloy actually caused the molten material to flow to the desired areas of contact, rather than out of it, as in the prior art. Thus, the subject invention provides a means of employing less braze alloy to accomplish a stronger more sound bond.

Other objects and advantages of our invention will become apparent from a more detailed description thereof during which our process will be described in connection with the fabrication of a gas turbine regenerator wheel which is depicted in the drawings.

Figure 1:
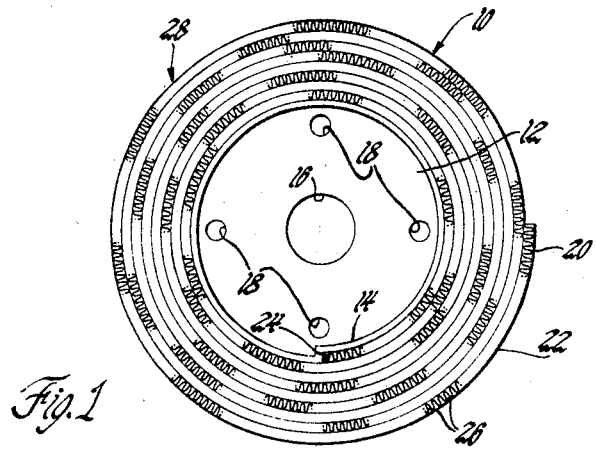
FIGURE 1 is a plan view of part of a gas turbine regenerator wheel showing the hub and a portion of the heat transfer matrix.

Regenerator wheels of the type depicted in FIGURE 1 are conventionally employed in gas turbine engines to recover heat from the exhaust gases by transferring it to incoming air. The wheel indicated generally at 10 in FIGURE 1 is depicted herein as being of the axial flow type. As shown, the wheel has a hub member 12 which has a generally spiral peripheral surface 14. Hole 16 is provided at the center of the hub 12 for a shaft (not shown) and holes 18 are provided to fasten the hub to a flange or other suitable device. Spirally wound upon the peripheral surface 14 of the hub are a corrugated sheet metal member 20 and a flat strip sheet metal member 22 the innermost ends of which abut the hub 12 at abutment surface 24 on peripheral surface 14 and which together form the regenerator matrix 28. As completely assembled the wheel provides a very large number of axially aligned channels 26 (perpendicular to the plane of the drawing) through which the turbine engine exhaust gas and intake air alternately flow. This particular article of manufacture has been chosen for use in connection with describing the subject invention because it requires literally thousands of brazed joints in its fabrication. It is preferred that the brazed joints be accomplished simultaneously and it is necessary that each joint be sound and effective to prevent lateral flow of the process fluid.

In a typical example, the hub and matrix of the regenerator wheel are about 3″ thick, this dimension being perpendicular to the plane of the drawing. The outside diameter of the hub member 12 is typically about 3″ to 4″, while the outside diameter of the regenerator matrix 28 may be about 30″. In order that the matrix may be fabricated to form the wheel 10 depicted generally in FIGURE 1, it is necessary to wind a corrugated strip 20 and a flat strip 22, each about 300 feet in length, in spiral fashion about the hub member 12 with the corrugated material lying innermost at each turn. In a typical application the hub 12, the corrugated member 20 and the flat strip member 22 are all formed of 304 stainless steel. The sheet stock is typically about 0.002″ thick and the crests 30 of the corrugated sheet are about ⅛″ high with about fifty crests 30 to the inch. Each crest 30 is brazed to the surface of the flat strip 22 immediately adjacent to it to prevent lateral flow of the process fluid passing therethrough so that lamellar flow may be maintained.

It will be appreciated that it would be virtually impossible to braze these joints one at a time. Moreover, if the braze alloy were preapplied to either the crests 30 or the flap strip 22, or if any other solid foreign metal were introduced therebetween, the flat strip 22 and the corrugated strip 20 could not be in tight metal-to-metal contact and slack would be introduced into the structure as it is wound about the hub. Upon heating, the braze alloy particle would melt and run from the desired joints leaving voids between the crests of the corrugated strip and the flat strip.

In accordance with the invention, a tacky substance is applied to both sides of the flat stainless steel strip member 22 prior to assembly. This may be accomplished by passing the strip between rollers of brushes which contain a suitable quantity of the tacky material. A preferred tacky material is a liquid epoxy resin, such as for example a reaction product of epichlorohydrin and Bisphenol-A, with no hardener or curing agent added. These materials are viscous, but fluid, and can be vaporized at temperatures below the fushion range of conventional brazing alloys. It is preferred that the tacky material be nondrying and nonhardening for at least 48 hours so that processing operations may, if necessary, be interrupted after the tacky material has been added but before the braze alloy powder has been applied.

Figure 2:
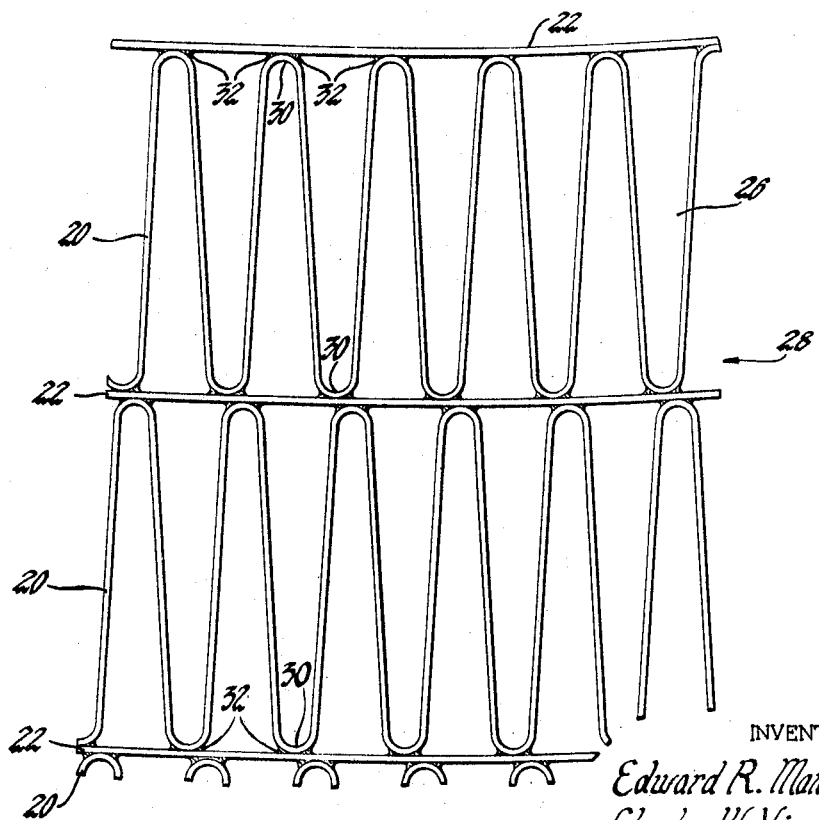
FIGURE 2 is a substantially magnified view of a portion of the regenerator matrix showing in detail a few of the brazed joints accomplished in accordance with the invention.

One end of both the corrugated strip 20 and the flat strip 22 are placed in abutting relationship with the abutment surface 24 of the hub by conventional means and fixturing. The corrugated strip and the flat strip are tightly wound about the hub member in spiral fashion until a regenerator matrix of suitable diameter has been built up. Care is taken to exert sufficient tension and pressure to achieve close metal-to-metal contact between each crest 30 of the corrugated strip 20 and the adjoining surfaces of the flat strip 22. As shown in FIGURES 1 and 2, the channels 26 lie perpendicular to the plane of the drawing, and it is apparent that the contacts between the crests 30 and the flat surface 22 are each substantially linear. The pressure between the surfaces tends to force any excess epoxy resin from between the contacting surfaces.

The unbonded assembly still being held under suitable tension is then dusted with a suitable braze alloy in powder form. A braze alloy comprising by weight 13% chromium, 10% phosphorus, 0.10% max. carbon, and the balance substantially all nickel in −325 mesh powder form is suitable for use with 304 stainless steel. This powder is dusted over the face of the regenerator matrix so that it may enter each of the many individual channels 26. The assembly is shaken or otherwise moved so that some of the powder has an opportunity to adhere to the tacky epoxy resin and thereby effectively coat it. The excess powder is poured out of the assembly and recovered for later use. The assembled regenerator wheel with braze alloy adhering adjacent each of the joints to be formed is then placed in a cold oven. The oven is warmed at a normal rate at about 200°–300° F. per hour. We prefer that a hydrogen atmosphere be employed in the furnace because hydrogen apparently assists in the thermal decomposition and vaporization of the epoxy resin. By the time that the temperature in the furnace has reached about 1000° F. substantially all of the epoxy resin has been vaporized in one form or another. The furnace is further warmed to a maximum temperature to about 1860°–1880° F. and held at this level for 10–20 minutes. The powder braze alloy melts, wets the stainless steel surface and by means of its own surface tension flows into the crevices 32 between the crests of the corrugated strip 20 and the flat strip 22 to form a fillet. At this point, the oven may be shut off and the assembly removed and cooled in a still atmosphere of hydrogen to about room temperature.

Because there was initial metal-to-metal contact between the corrugated strip and the flat strip which was unimpaired by the presence of any solid metal, such as brazing alloy, the resulting spiral wound structure is just as tight at the completion of the brazing operation as it was at the completion of the assembly step. Structures produced in this way have been examined and it was observed that more than 95% of the thousands of brazes were complete and void free.

It will be appreciated that any of a number of materials may be used as the tacky substance which catches and holds the powder braze alloy in the region of the joint which is to be formed. Besides unhardened epoxy resin, we have also used a mixture of oleic acid and rosin. Standard braze alloy binders, which are conventionally applied as a mixture with the braze alloy to a metal surface, may also be employed by themselves so long as they do not dry and lose their tackiness before the assembly operation can be completed and the braze alloy dusted over the structure.

It will also be appreciated that in the example described, the tacky substance was applied to completely cover both sides of the flat strip. This is because the individual brazes were to be only about 1/25" apart. In any given specific application of our invention the tacky substance may of course, be applied to one or both of the metal surfaces to be joined as may be required to hold a suitable amount of braze alloy in an individual case. This determination may be made by experiment and judgment whenever the invention is to be applied to a different assembly. It will also be appreciated that when the individual brazed joints are not to be as close together as in the regenerator wheel, the tacky material need only be applied at those locations where the braze is to be made. Because we rely in part upon the availability of metal surfaces adjacent the joint which is to be formed to support the tacky substance and the powdered braze alloy, and in part upon the surface tension of the braze alloy to flow into and around the joint, it will be appreciated that our invention will be most useful in forming brazed joints which are substantially linear in character as opposed to those brazed bonds involving massive areas of the components to be joined. In this case, the term linear refers to lines of any shape and is not intended to be limited to straight lines.

While our invention has been described in terms of an illustrative embodiment, it will be appreciated that other forms might readily be adapted by those skilled in the art and accordingly the scope of our invention should be considered limited only by the following claims.

We claim:

1. A method of brazing a first metal component to a second metal component wherein the region of mutual contact between said components includes only a portion of the surface of said first metal component adjacent said second metal component, said method comprising the steps of applying a tacky material to said surface of said first metal component in the region at which a braze bond is to be formed; placing said second metal component in close contact with said first metal component at said portion of said surface to form an assembled joint; dusting said metal surface around said assembled joint with braze alloy powder, a portion of said powder adhering to said tacky material; heating said assembled joint to an elevated temperature to first vaporize said tacky material and then to melt said braze alloy, said molten braze alloy wetting said metal components and the close contact between said metal components and the surface tension of said molten alloy cooperating to permit it to flow around and between said metal components; and cooling said assembly to solidify said alloy and thereby produce a strong brazed joint between said two metal components.

2. A method of brazing a flat surface portion of a first metal component to a curved surface portion of a second metal component in tangent-like relationship, said method comprising the steps of applying a tacky material to at least one of said surface portions; placing said components in close contact at the respective said surface portions to form an assembled joint; dusting the surfaces of said metal components around said assembled joint with braze alloy powder, a portion of said powder adhering to said tacky material; heating said assembled joint to an elevated temperature to vaporize said tacky material and further heating said assembled joint to a greater elevated temperature to melt said braze alloy, said molten braze alloy wetting said metal components and the close contact between said metal components and the surface tension of said molten alloy cooperating to permit it to flow around and between said metal components; and cooling said assembly to solidify said alloy and thereby produce a strong brazed joint between said two metal components.

3. A method of brazing comprising the steps of applying a tacky material to a first metal surface; placing said first metal surface in close contact with a second metal surface to form an assembled joint, the region of said close contact between said metal surfaces being substantially linear; dusting said metal surfaces around said assembled joint with braze alloy powder, a portion of said powder adhering to said tacky material; heating said assembled joint to an elevated temperature to first vaporize said tacky material and then to melt said braze alloy, said molten braze alloy wetting said metal surfaces and the close contact between said metal surfaces and the surface tension of said molten alloy cooperating to permit it to flow around and between said contacting metal surfaces; and cooling said assembly to solidify said alloy and thereby produce a strong brazed joint between said two metal surfaces free of voids.

4. A method of fabricating an assembly of a plurality of metal components which are to be joined by brazing at predetermined locations on their respective surfaces in close metal-to-metal contact, said brazed joints at said locations of contact being substantially linear in configuration, said method comprising the steps of applying a tacky binder material to at least one of said components at its said surface locations; positioning and supporting said metal components with their respective said surfaces in close metal-to-metal contact to form an assembled structure wherein there is only a thin film of said tacky material separating the substantially linear contacts between said metal components; dusting said assembled structure with braze alloy powder, a portion of said powder adhering to said tacky material on said metal surfaces; heating said assembled structure to an elevated temperature to first vaporize said tacky material and then to melt said braze alloy, said molten alloy flowing around and between said metal surfaces at said locations of contact to form a fillet; and cooling said structure to solidify said alloy and produce a plurality of strong, tight, brazed joints.

5. A method of fabricating a gas turbine regenerator wheel having a hub and a thin flat metal sheet and a thin corrugated metal sheet wound in alternate spiral layers about the outer surface of said hub, said method comprising the steps of applying a thin layer of tacky binder material to both sides of said flat metal sheet; tightly winding said corrugated sheet and said flat sheet in spiral fashion about said hub member to form an assembled structure, said corrugated sheet being adjacent said hub, the crests of said corrugated sheet being pressed in close metal-to-metal contact with the adjoining flat sheet layer; dusting powdered braze alloy through the channels formed between said flat sheet and said corrugated sheet some of said powder adhering to said tacky binder material; heating said assembled structure to an elevated temperature to first vaporize said tacky material therefrom and then to melt said braze alloy, said molten alloy flowing around and between the points of contact of said flat sheet and the crests of said corrugated sheet to form a fillet; and cooling said structure to solidify said alloy and produce strong brazed joints between the crests of said corrugated sheet and the adjoining surface of said flat sheet.

References Cited
UNITED STATES PATENTS

| | | | |
|---|---|---|---|
| 1,700,604 | 1/1929 | Wagener | 29—500 XR |
| 2,389,175 | 11/1945 | Woods | 29—500 XR |
| 3,129,502 | 4/1964 | Olson | 29—502 XR |
| 3,208,131 | 9/1965 | Ruff et al. | 29—471.1 XR |
| 3,222,775 | 12/1965 | Whitney | 29—502 XR |
| 3,255,646 | 6/1966 | Urschel | 29—500 XR |

JOHN F. CAMPBELL, Primary Examiner

R. B. LAZARUS, Assistant Examiner

U.S. Cl. X.R.

29—471.1, 490, 500